(12) United States Patent
Lamberto (10) Patent No.: US 10,946,400 B2
(45) Date of Patent: Mar. 16, 2021

(54) DISPENSING DEVICE FOR FLUID PRODUCTS

(71) Applicant: APTAR ITALIA S.p.A., San Giovanni Teatino (IT)

(72) Inventor: Carta Lamberto, Pescara (IT)

(73) Assignee: APTAR ITALIA S.P.A., San Giovanni Teatino (IT)

( * ) Notice: Subject to any disclaimer, the term of this patent is extended or adjusted under 35 U.S.C. 154(b) by 0 days.

(21) Appl. No.: 16/474,722

(22) PCT Filed: Sep. 28, 2017

(86) PCT No.: PCT/IT2017/000209
§ 371 (c)(1),
(2) Date: Jun. 28, 2019

(87) PCT Pub. No.: WO2018/122882
PCT Pub. Date: Jul. 5, 2018

(65) Prior Publication Data
US 2019/0321840 A1 Oct. 24, 2019

(30) Foreign Application Priority Data
Dec. 28, 2016 (IT) .................. 102016000131538

(51) Int. Cl.
*B05B 11/00* (2006.01)
*G01F 11/02* (2006.01)
(Continued)

(52) U.S. Cl.
CPC ........ *B05B 11/0072* (2013.01); *B05B 11/007* (2013.01); *B05B 11/0044* (2018.08);
(Continued)

(58) Field of Classification Search
CPC ............ B05B 11/0072; B05B 11/0044; B05B 11/007; B05B 11/3047; B05B 11/306;
(Continued)

(56) References Cited

U.S. PATENT DOCUMENTS 2,378,624 A * 6/1945 Edwards ............. B05B 11/3001
222/205
2,593,591 A 4/1952 Benjamin
(Continued)

FOREIGN PATENT DOCUMENTS

CH 406544 A 1/1966

OTHER PUBLICATIONS

International Search Report in International Application No. PCT/IT2017/000209, dated May 28, 2018.

*Primary Examiner* — Frederick C Nicolas
(74) *Attorney, Agent, or Firm* — Nixon & Vanderhye (57) ABSTRACT

A dispensing device for fluid products includes a draw-up pipe, a main body and a dispensing head. The main body includes a pumping system, connected to the draw-up pipe and a fastening ring nut, for fixing the dispensing device to a container for fluid products. The fastening ring nut and the pumping system are mutually coupled for forming between them an air compensation duct which allows the selective passage of air from the outside towards the inside of the container during the operation of the dispensing device. The dispensing head in turn includes a cup, which has in a relative lower portion a passage, and a valve, housed in the lower portion of the cup, configured to adopt a first configuration, or open configuration, wherein the passage is put in fluid communication with the pumping system and a second configuration, or closed configuration, wherein the passage is occluded.

23 Claims, 5 Drawing Sheets

(51) Int. Cl.
*G01F 11/32* (2006.01)
*G01F 19/00* (2006.01)

(52) U.S. Cl.
CPC ........ *B05B 11/306* (2013.01); *B05B 11/3047* (2013.01); *G01F 11/028* (2013.01); *G01F 11/32* (2013.01); *B05B 11/0062* (2013.01); *G01F 19/00* (2013.01)

(58) Field of Classification Search
CPC .... B05B 11/0062; G01F 11/028; G01F 11/32; G01F 19/00
See application file for complete search history.

(56) References Cited

U.S. PATENT DOCUMENTS

| | | | | |
|---|---|---|---|---|
| 2,774,517 A | * | 12/1956 | Teegardin | A47K 5/1205 222/205 |
| 4,757,922 A | | 7/1988 | Landecker | |
| 5,415,327 A | * | 5/1995 | Favre | B05B 11/00412 222/321.8 |
| 5,967,377 A | * | 10/1999 | Glynn | B05B 11/3004 222/158 |
| 2005/0218160 A1 | | 10/2005 | Masatoshi | |

* cited by examiner

DISPENSING DEVICE FOR FLUID PRODUCTS

BACKGROUND OF THE INVENTION

Field of the Invention

This invention relates to the field of dispensers.

More specifically, this invention relates to a dispensing device for fluid products.

Description of the Related Art

In the prior art dispensing devices, the end part of the dispensing conduit is made generally made of an element through which the dispensing device is operated by a user.

This element, or dispensing head, may have shapes of various types, the most common have a spout for dispensing the product into the hands of a user, but in some cases the dispensing head can have other shapes, such as that of a cup in which the product is collected and from which the user can draw at a later time.

In the case of a cup-shaped dispensing head, following operation the liquid is pumped from the bottle and dispensed inside the cup, which, as well as allowing dosing of the fluid, may in some cases be subsequently removed to transport and pour the fluid where it is necessary.

This solution offers the advantage of being able to collect an equal quantity of liquid in more than one dispensing, each of them provided by a single actuation, and to be able to transport the liquid in an easy fashion allowing it to be poured remotely, without having to move the entire container close the point of use of the product it contains.

This type of dispensing device allows an undoubted advantage, especially for those applications where it is necessary to pour a consistent and/or variable quantity of liquid, or in the case of a container with large dimensions when its movement is not very easy or even impossible.

However, this type of the dispensing device still has drawbacks which reduce the efficiency. In effect, to prevent that after removal of the cup from the dispensing device the liquid contained therein escapes, it is necessary that there is present in the cup a duct, open at the top, which extends up to the higher part of its inner part.

However, this duct occupies a considerable portion of the inner space of the cup, reducing the capacity. Due to this drawback, especially for applications where it is necessary to dose a large quantity of fluid, it might be necessary to fill the cup several times, thereby increasing the time necessary for the operation and adding the complication of having to remember the quantity of fluid supplied during successive fillings of the cup necessary to reach the required quantity.

The dispensing head also usually performs the important role of allowing the locking and releasing of the dispensing device.

More specifically, some systems comprise the locking with the dispensing head in a position high, so-called up-locking, where the elastic means inside the pumping system of the dispensing device are in an extended configuration, other systems comprise, on the other hand, the locking of the dispensing head in a position low, so-called down-locking, wherein the elastic means inside the pumping system are in a compressed configuration.

BRIEF SUMMARY OF THE INVENTION

This aspect is particularly important both to prevent an accidental dispensing of the fluid and during shipping and transporting of the dispensing device where preventing the movement of its parts with respect to each other reduces the mechanical stress to which the dispensing device is subjected and consequently reduces the risk of damaging it.

As well as dispensing the liquid, the dispensing devices must obviously also allow the sealing of the package. The requirement is essential and must be guaranteed at least in the non-operating moments. On the other hand, it is necessary to guarantee, during use, the entrance of air from the outside environment towards the inside of the bottle, to compensate for the reduction of fluid as the container is gradually emptied.

This result is obtained through the passages that selectively put in fluid communication the inside of the bottle with the outside environment, opening and allowing the passage of the air during operation of the dispensing device and remaining closed in the rest condition.

In the majority of the dispensing devices present on the market these passages extend, at least partly, inside the central module.

In this case, during the storage and transport of the packages, before use, the liquid can accumulate in the spaces inside the pumping module, which communicate with the bottle.

More specifically, in the down-locking dispensing devices there is the possibility of a considerable accumulation of liquid inside the pumping system, in particular in the upper part, into which the liquid typically gains access through one or more ventilation holes.

It can therefore happen that, at the moment of the first use, that is to say, during the first opening of the dispensing device when the pumping system moves into a configuration ready for use, the liquid accumulated inside it is pumped backwards, flowing towards the outside through the passages for entrance of the air, thus soiling the package. This feature may be particularly significant, and very unpleasant, especially in the dispensing devices with a high dosage.

In this context, the technical purpose which forms the basis of this invention is to provide a dispensing device for fluid products which overcomes at least some of the above-mentioned drawbacks of the prior art.

More specifically, the aim of this invention is to provide a dispensing device for fluid products which is able to maximize the useful volume inside the cup of the dispensing device and, if necessary, prevent the occurrence of back pumping effects whilst maintaining a stable and resistant structure.

The technical purpose indicated and the aims specified are substantially achieved by a dispensing device for fluid products comprising the technical features described in one or more of the appended claims.

The invention describes a dispensing device for fluid products which comprises: a draw-up pipe; a main body equipped with a pumping system, connected to the draw-up pipe, and a fastening ring nut, for fixing the dispensing device to a container for fluid products, and a dispensing head.

The dispensing head in turn comprises a cup, which has in a relative lower portion a passage, a lid configured to close and cover at least partly the cup and a valve, housed in the lower portion of the cup, configured to adopt a first configuration, or open configuration, wherein the passage is put in fluid communication with the pumping system and a second configuration, or closed configuration, wherein the passage is occluded.

BRIEF DESCRIPTION OF THE DRAWINGS

The fastening ring nut and the pumping system are mutually coupled for forming between them an air compensation duct which allows the selective passage of air from the outside towards the inside of the container during the operation of the dispensing device.

Further features and advantages of the invention are more apparent in the detailed description below, with reference to a preferred, non-limiting, embodiment of a dispensing device for fluid products as illustrated in the accompanying drawings, in which.

DETAILED DESCRIPTION OF THE PREFERRED EMBODIMENTS

Figure 1:
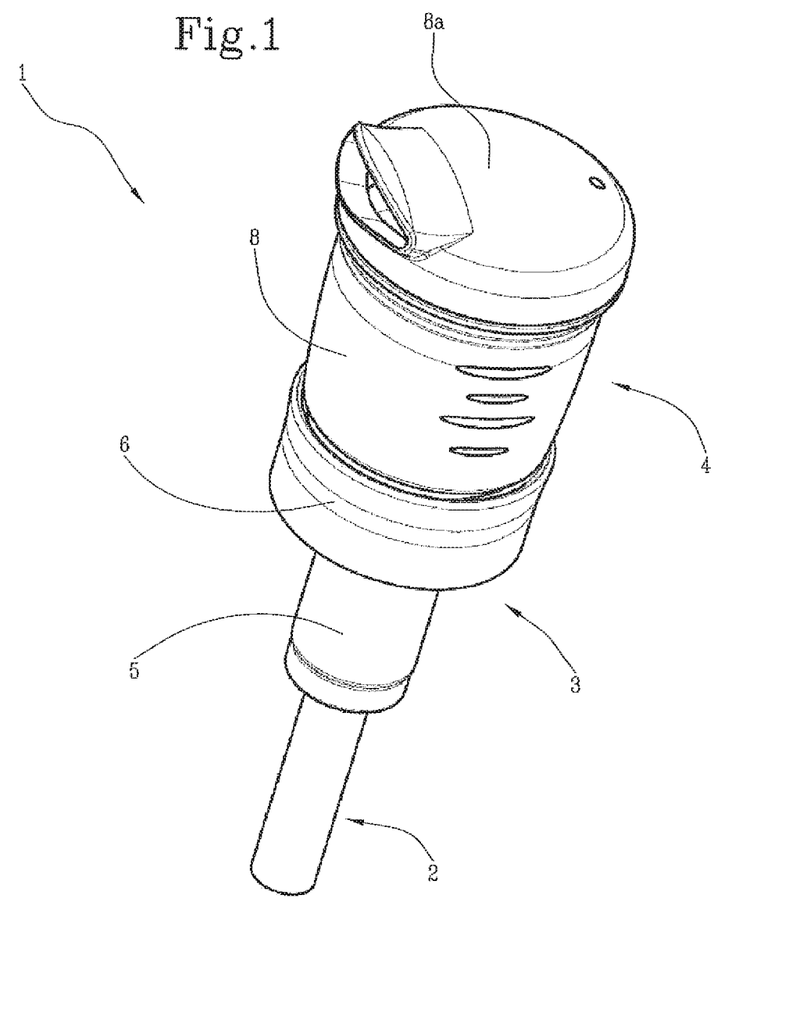
FIG. 1 shows a perspective view of a dispensing device for fluid products according the invention.

A dispensing device for fluid products according to the invention is generally denoted in FIG. 1 with numeral 1. The dispensing device comprises a draw-up pipe 2, a main body 3 and a dispensing head 4.

The draw-up the pipe 2 is configured to be placed in contact in a relative end with the fluid present inside a container, not illustrated. The other end of the draw-up pipe 2 is, on the other hand, put in fluid communication with the main body 3 of the dispensing device 1.

Figure 2:
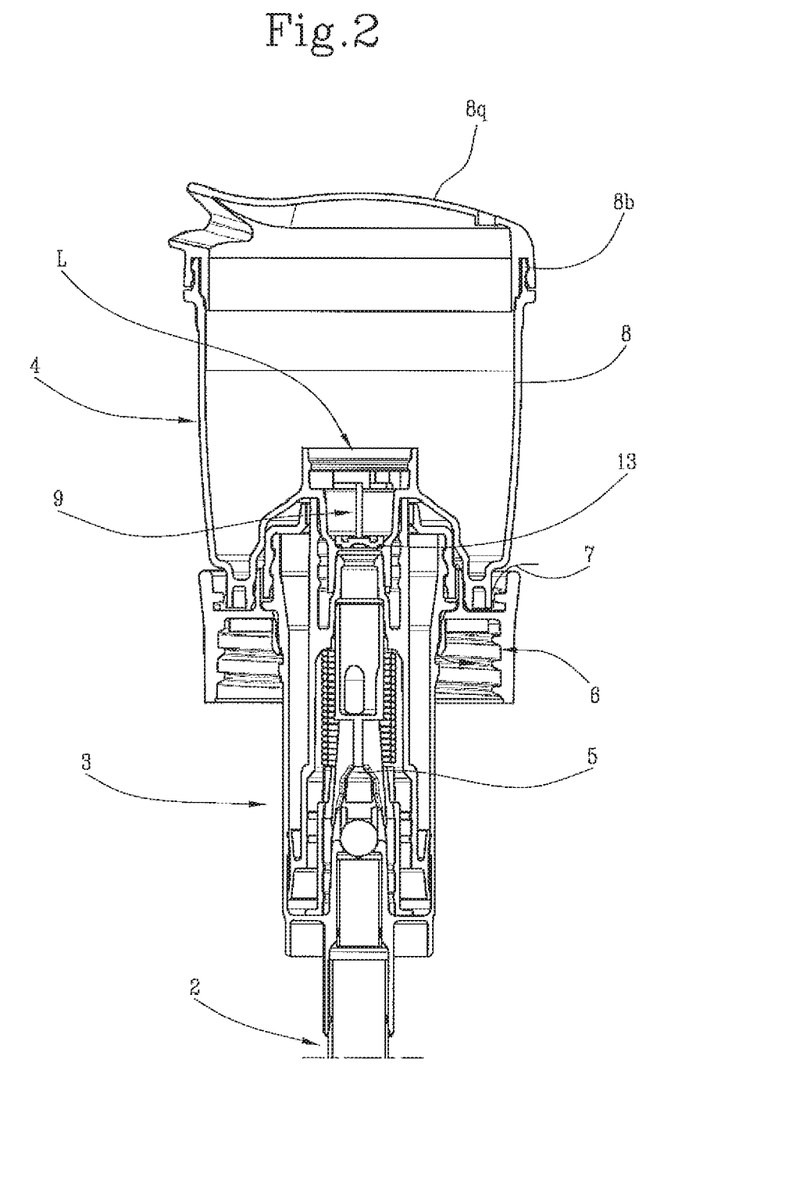
FIG. 2 shows a cross section view of a dispensing device according to the invention.

The main body 3 comprises a pumping system 5 which performs the dual function of connecting the draw-up pipe 2 with the dispensing head 4 and enclosing all the structural elements necessary for the pumping of the liquid, which occurs as in prior art systems, that is, by pressing the dispensing head 4 in such a way that the pressure is transmitted to the pumping system which sucks the fluid by means of the draw-up pipe 2 and transmits it to the dispensing head 4.

However, the mobility of the dispensing head 4 makes the dispensing device 1 more damageable, especially during transport. For this reason, it is equipped with a reversible locking mechanism which allows the dispensing head 4 to be locked, preventing the movement, thereby obtaining the twofold effect of preventing accidental dispensing and make the dispensing device 1 stronger.

In a dispensing device 1 according to the invention, the locking mechanism may be one between: screw stop, bayonet stop, and it may be further equipped with a security seal, not illustrated in the accompanying drawings, which guarantees, especially during first use, the integrity of the product.

The main body 3 also comprises a fastening ring nut 6 configured for fixing the dispensing device 1 to a container for fluid products.

In the embodiment proposed, the locking mechanism is made through a screw coupling between the dispensing head 4 and the ring nut 6 and allows the locking of the dispensing device 1 with the dispensing head 4 in the low, end of stroke position wherein the elastic means inside the pumping system 5 are in a compressed configuration.

Figure 7:
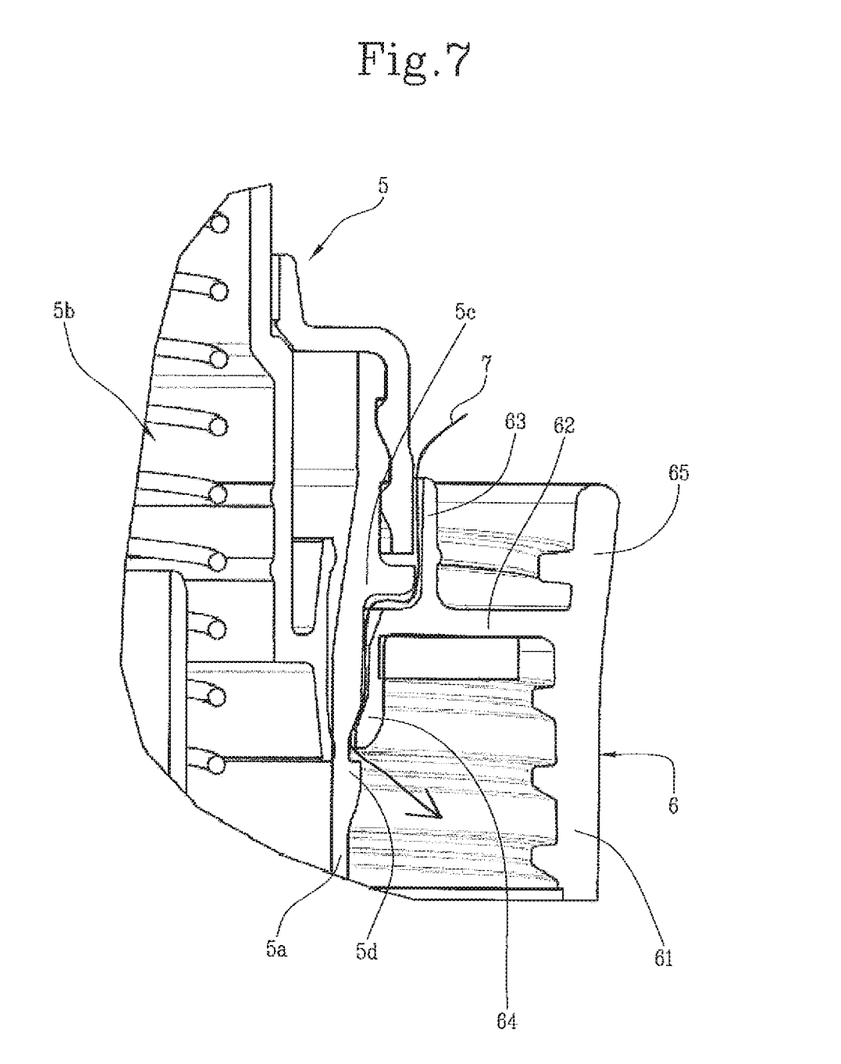
FIG. 7 shows a detail of the air compensation duct according to the invention.

Advantageously, the pumping system 5 and the fastening ring nut 6 are mutually coupled for forming between them an air compensation duct 7 for the selective passage of air from the outside towards the inside of the container during the operation of the dispensing device 1. In other words, the particular structural shape of the two elements which make up the main body 3 of the dispensing device 1 is such that, once assembled, it forms between them the formation of an air compensation duct 7 through which the air can pass inside the container in order to top up the quantity of fluid escaped therefrom as a result of actuation of the dispensing device 1.

In this way, since the air compensation duct 7 is outside the pumping system 5 of the dispensing device 1, the fluid product cannot accumulate inside the pumping system 5 and, in particular during its first use, it prevents the occurrence of back pumping phenomena, in which the fluid accumulated inside the pumping system 5, is expelled from the pumping system 5, pushed backwards through the air compensation duct 7.

Figure 3:
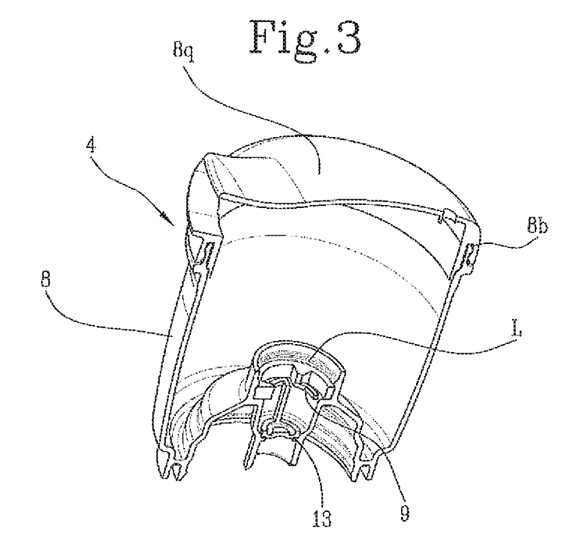
FIG. 3 shows a perspective cross section view of a dispensing head.

According to the particular embodiment, described here by way of a non-limiting example, the dispensing head 4 comprises a cup 8 which defines an inner chamber in which is collected the fluid product pumped through the pumping system 5 and it is equipped with a relative lower portion of a passage "L" which places the cup 8 in fluid communication with the main body 3. Advantageously, the L-shaped passage being positioned in the lower portion of the cup 8 makes available the entire volume above it to be filled with the fluid. In other words, the fluid leads directly in the cup 8 at the L-shaped passage.

Advantageously, the cup 8 is graduated; in this way it is possible to fill it with a precisely measurable quantity of fluid.

Figure 5:
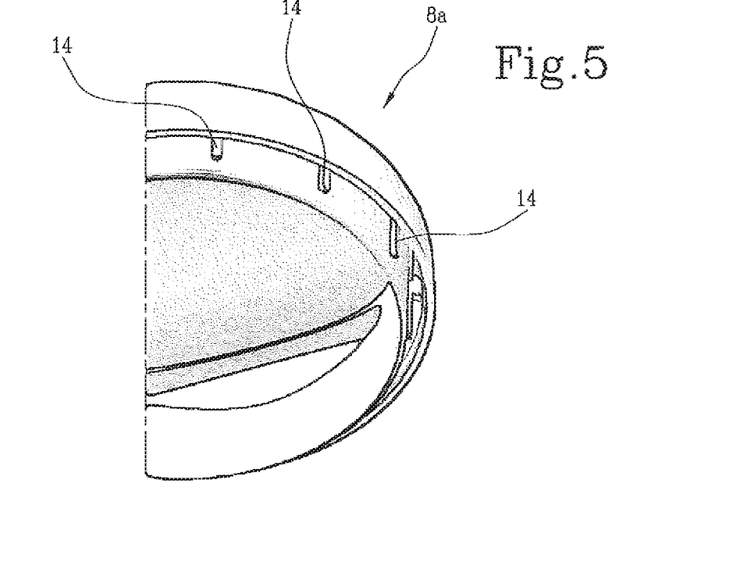
FIG. 5 shows a partial perspective view of a lid of the dispensing device according to the invention.

The cup 8 is covered and closed at least partly by a lid 8a which advantageously also provides a convenient surface on which to apply the force designed to impart to the dispensing head 4 the pressure needed to activate the pumping system 5 of the dispensing device 1.

Figure 4:
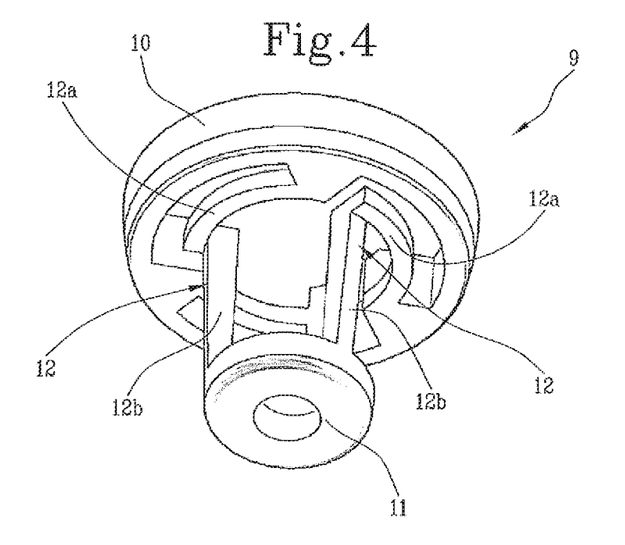
FIG. 4 shows a detailed perspective view of a valve for a dispensing head according to the invention.

The dispensing head 4 also comprises a valve 9, housed in the lower portion of the cup 8, close to the point of connection with the main body 3. Preferably, the valve 9 is positioned at the passage "L".

The valve 9 is configured to allow the opening and the closing of the passage "L" of the cup 8. More specifically, the valve 9 is configured to adopt a first configuration, or open configuration, wherein the passage "L" of the lower portion of the cup 8 is put in fluid communication with the pumping system 5 of the main body 3 of the dispensing device 1 and a second configuration, or closed configuration, wherein the passage "L" is occluded and the passage of fluid through it is not therefore possible.

Figure 6:
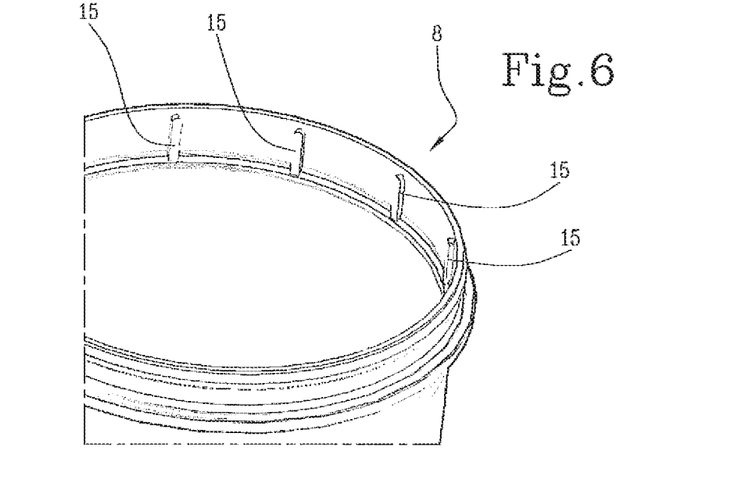
FIG. 6 shows a partial perspective view of a cup of the dispensing device according to the invention.

The lid 8a and the cup 8 are made by two distinct structures which comprise respective means for reversible connection.

The lid has an annular groove 8b designed to receive an upper portion of the cup 8, in a reversible manner According to the particular embodiment illustrated, shows the valve 9 comprises an annular element 10 configured for securely fixing the valve 9 to the lower portion of the cup 8.

The valve 9 also comprises a partition 11 axially mobile, along the flowing direction of the fluid from the main body 3 to the dispensing head 4, configured so that the valve 9 can take up the open configuration or closed configuration.

The valve 9 also comprises a plurality of braces 12 which connect the annular element 10 with the partition 11 and defining elastic elements for actuating the axial movement of the partition 11.

Preferably, the partition 11 is positioned at a height different from the annular element 10 along the main direction of extension of the dispensing device. Consequently, the braces 12 extend at least partly along the main direction of extension.

In accordance with a possible embodiment, each brace comprises an arched portion 12a which extends from the annular element 10 and is parallel to the annular element 10 and a rectilinear portion 12b connecting between the curved portion 12a and the partition 11.

Preferably, the rectilinear portion 12b is positioned parallel to the main direction of extension.

Preferably, the braces 12 are uniformly distributed around the main direction of extension of the dispensing device 1, for example there being three braces 12 located at 120° from each other.

According to a possible embodiment, the partition 11 is disc-shaped and is positioned coaxial with the annular element 10.

The purpose of the valve 9 is to guarantee the access of the fluid product from the main body 3 to the cup 8 when the pumping system 5 is activated by the pressure applied by a user on the dispensing head 4, and ensure the containment, through the occluding of the passage "L" of the cup 8, when the pumping system 5 is in the rest configuration.

The valve 9 and the cup 8 may also be made as a single element. In other words, the annular element 10 is made in one piece with the cup 8.

Advantageously, the dispensing head 4 and the main body 3 are made by two different and separate structures which comprise respective reversible connecting means; in other words, it is possible to connect and separate the two elements according to requirements.

More specifically, the dispensing head 4 has a double connection with the main body 3. A first connection, which is reversible, is between the dispensing head 4 and the ring nut 6 to allow the locking of the dispensing device 1; a second connection, which is also reversible, is between the dispensing head 4 and the pumping system 5 and allows the dispensing head 4 to be separated completely from the main body 3 of the dispensing device 1.

The valve 9 adopts the open configuration when the pumping system 5 is activated by the pressure applied by a user on the dispensing head 4. When, the other hand, the dispensing device 1 is at rest, the valve adopts the closed configuration which it maintains even when the cup 8 is separated from the main body 3 of the dispensing device 1. In this way, it is possible to fill the cup 8 with the desired quantity of fluid by activating the pumping system 5 and then removing it so as to transport the fluid dispensed where necessary without the need to move the entire container, whilst the valve 9 prevents the discharge of fluid from the passage "L" located in the lower portion of the dispensing head 4.

More in detail, with reference to the specific embodiment, the partition 11 remains in the closed configuration even when the cup 8 is positioned on the main body 3 and the partition 11 rises axially towards the annular element 10 pushed by the flow when the fluid is pumped from the container and consequently the braces 12 deform.

When there is no pushing action which deforms the braces 12, the latter generate the elastic return of the partition 11 in the closed configuration illustrated for example in FIG. 3.

In this closed configuration, the partition 11 is placed against and in a sealed fashion on an annular lip 13 of the cup 8 inside the passage "L".

The valve 9 may be made, as an alternative to the solution just illustrated in detail, even with another embodiment, but preferably it must be equipped with an elastic structure which favours the closing when there is no product flow.

In order to make the dispensing device 1 more resistant to impacts and therefore reduce the risk of damage to it, especially if the journey from the manufacturer to the customer requires long distance, the lid 8a has ribs 14 on an inner wall of the cup 8, designed to absorb any deforming force, thus preventing damage to the dispensing device 1 if it undergoes impacts during transport.

The ribs 14 are positioned substantially along the main direction of extension of the dispensing device and are distributed in a circumferential manner around the portion of the lid 8a configured to be associated to the cup 8.

Moreover, there may be further ribs 15 made in an inner surface of the cup 8 and acting in conjunction with the ribs 14 in such a way as to render rotationally integral the lid 8a with the cup 8 so that each rotation applied to one between the cup 8 and the lid 8a is transmitted unchanged also to the other element.

Again in order to improve the strength of the dispensing device 1 the lower portion of the cup 8 may have an S-shaped profile configured for making a cup-shaped spring designed to absorb a deforming force exerted on the dispensing device 1.

The air compensation duct 7 as described above may be used with any dispensing head 4 even not cup-shaped and/or not having the valve 9. For example, according to another possible embodiment not illustrated, the dispensing head 4 is made by means of a traditional dispensing head, that is, with direct dispensing, without this preventing the making of the air compensation duct 7 as described above allowing the occurrence of back pumping phenomena to be prevented.

Also, the particular dispensing head 4 described above in detail and shown in the accompanying drawings might also be used in a system which makes an air compensation duct 7 according to the prior art.

More specifically, FIG. 7 shows a detail of the portion of the dispensing device 1 in which extends the air compensation duct 7.

It may be noted that the fastening ring nut 6 and the pumping system 5 are mutually coupled for forming between them an air compensation duct 7 for the selective passage of air from the outside towards the inside of the container during the operation of the dispensing device 1.

More in detail the pumping system 5 comprises: a pumping device 5b and an outer body 5a which houses inside it the pumping device 5b. The outer body 5a is substantially tubular in shape and can be inserted axially inside the central opening of the fastening ring nut 6.

The fastening ring nut 6, on the other hand, has a first hollow cylindrical portion 61 which has a main direction of extension parallel to the flowing direction of the fluid from the main body 3 to the dispensing head 4 and is equipped internally with a threaded profile.

The fastening ring nut 6 also has a disc-shaped second portion 62, positioned transversally to the flowing direction of the fluid and inside the first portion 61. The second portion 62 is positioned at a height such as to divide the first portion in a lower area, having a first thread which makes it possible to engage the ring nut with a respective threaded profile of a cylindrical end of a container for fluid products, and an upper zone 65.

There is also a vertical step 63, extending from the second portion 62 towards the dispensing head in a direction parallel to the direction of flowing of the fluid in a radially internal position with respect to the upper zone 65, equipped with an expansion element 63a, defining a locking mechanism, designed to engage with a respective expansion element 8c of the cup 8 of the dispensing head 4 in order to allow it to be locked stably, even though reversibly, in a lowered position.

According to a further possible embodiment, the dispensing head 4 can be locked in the lowered position by a second thread obtained in the upper zone 65 of the fastening ring nut 6, which can be coupled with a respective thread in a portion of the cup 8 of the dispensing head 4.

In this way, it is possible to constrain the dispensing device in a compact and stable position reducing the risk of damaging it, especially, for example, during transport.

Lastly, the fastening ring nut 6 comprises an elastic tab 64 which extends from an edge radially inside the second portion 62 in a direction parallel to the flowing direction of the fluid towards the draw-up pipe 2. According to a preferred embodiment, the tab 64 is located in a position radially inside the step 63.

The upper zone 65 and the vertical step 63 define the edges of a non-through seat designed to receive the lower portion of the dispensing head 4 when this is in the low end of stroke position in which can be locked by the action of the locking mechanism.

Advantageously, the central body 5a has a step 5c configured for making contact with the edge radially inside the second portion 62 of the fastening ring nut 6, defining a maximum depth for inserting the pumping system 5 inside the fastening ring nut 6. In other words, when the pumping system 5 is inserted in the central opening of the fastening ring nut 6 the step 5c forms a block which makes it impossible to accidentally insert the pumping system 5 too deep, thereby compromising its functionality.

In the same manner, the tab 64 is configured for making contact with a step 5d of the outer body 5a in such a way as to prevent the withdrawal of the pumping system 5 from the fixing ring nut 6 after this has been inserted inside it.

In this way the pumping system 5 is axially movable along the direction of flowing of the fluid; this movement is, however, limited between two stop ends, the first stop end is defined by the step 5c configured for making contact with a portion of the fastening ring nut 6, whilst the second stop end is defined by the elastic tab 64 configured for making contact with a step 5d of the outer body 5a. Advantageously, the tab 64 is elastically deformable.

More specifically, the tongue 64 is designed to adopt a first rest position when the dispensing device 1 is not being used (not actuated) and the dispensing head 4 is disconnected from the ring nut 6.

In this configuration the outer body 5a rests on the tab 64 with the step 5c in a raised position relative to the edge radially inside the second portion 62 of the fastening ring nut 6. The tab 64 is also provided with a second elastically deformed configuration which is determined by the action of the outer body 5a when the latter is in the lowered position with the step 5c in contact with the edge radially inside the second portion 62 of the fastening ring nut 6. This condition occurs when the dispensing head 4 is locked in the low end of stroke position by the action of the locking mechanism. In this configuration the fluid communication achieved using the air compensation duct 7 is stably interrupted by the effect of the pressure applied at the contact points by the compressive action between the body 5a and the ring nut 6 which is generated when the dispensing head 4 is screwed against the ring nut 6. On the other hand, in the first rest configuration the fluid communication, ideally interrupted in the area of contact between the tab 64 and the outer body 5a, is in practice possible due to the effect of the inevitable surface imperfections present along the area of contact, or is in any case restored occasionally when the pumping system 5 is moved or lifted by the effect of external actions such as, for example, if the dispensing head 4 is uncoupled from the pumping system 5.

Is also possible to shape the contact surfaces between the tab 64 and the outer body 5a with suitable discontinuities 5e, preferably projections and/or recesses, in such a way that the contact surface is complete for those portions which are in contact when the tab 64 is in the deformed configuration, with the outer body 5a completely lowered, and is, on the other hand, discontinuous for those surface portions mutually in contact in the rest configuration.

More specifically, the air compensation duct 7 has at least a first stretch passing between the outer body 5a and the vertical step 63 and a second stretch passing between the outer body 5a and the tab 64.

Advantageously, the air compensation duct 7, defined by the pumping system 5 and by the fastening ring nut 6, allows elimination of the back pumping phenomenon, since, as it is not formed inside the pumping system 5, it prevents the accumulation of fluid inside it with the consequent risk of release during activation of the dispensing device 1, especially in down-locking type dispensing devices.

Advantageously, the presence of certain measures such as the ribs present in the lid 8a and the particular shape of the lower portion of the cup 8 improves the mechanical strength of the dispensing device 1, reducing the risk that it is damaged following impacts, for example during the dispatch operations.

Advantageously, the presence of the valve 9 allows the use of the space inside the cup 8 to be optimised and at the same time prevents the escape of the fluid when the dispensing head 4 is separated from the main body 3 of the dispensing device.

The invention claimed is:

1. A dispensing device (1) for fluid products comprising:
   a draw-up pipe (2) which defines a main direction of extension of the dispensing device;
   a main body (3) comprising a pumping system (5) connected to the draw-up pipe (2) and a fastening ring nut (6) configured for fixing the dispensing device (1) to a container for fluid products;
   a dispensing head (4) connected to the main body;
   wherein the dispensing head (4) comprises:
   a cup (8) defining an inner chamber for receiving a measured quantity of a fluid product and having a passage (L) defining a gap in a relative lower portion;
   a valve (9) housed in the lower portion of the cup (8) and configured to adopt a first configuration, or open configuration, wherein the passage (L) in the lower portion of the cup (8) is put in fluid communication with the pumping system (5) of the main body of the dispensing device and a second configuration, or closed configuration, wherein the passage (L) of the fluid product is occluded,
   wherein the valve (9) comprises:

an annular connecting element (10) positioned around the main direction of extension for securely fixing the valve (9) to the lower portion of the cup (8);

a partition (11) axially mobile along a sliding direction of the fluid products from the main body (3) to the dispensing head (4), configured so that the valve (9) can take up the open configuration and closed configuration; and a plurality of braces (12) which connect the annular element (10) with the partition (11) and defining elastic elements for actuating the axial movement of the partition (11).

2. The dispensing device according to claim 1, wherein the partition (11) is positioned at a height different to the annular element (10) along the main direction of extension of the dispensing device (1) and wherein the braces (12) extend at least partly along the main direction of extension.

3. The dispensing device according to claim 2, wherein each brace of the braces (12) comprises an arched portion (12a)) which extends from the annular element (10) and is parallel to the annular element (10) and a rectilinear portion (12b) connecting between the arched portion (12a) and the partition (11).

4. The dispensing device according to claim 2, wherein the partition (11) is disc-shaped and is positioned coaxial with the annular element (10).

5. The dispensing device according to claim 1, wherein the braces (12) are uniformly distributed around the main direction of extension of the dispensing device (1).

6. The dispensing device according to claim 1, wherein the cup (8) has an annular lip (13) inside the passage (L) designed to support and seal the partition (11), in the closed configuration.

7. The dispensing device according to claim 1, wherein the cup (8) and the valve (9) are made in a single piece.

8. The dispensing device according to claim 1, wherein the dispensing head (4) and the main body (3) are made of two different structures comprising respective reversible connecting means and shaped in such a way as to facilitate coupling.

9. The dispensing device according to claim 1, wherein the valve (9) is configured to adopt the open configuration when the cup (8) is connected to the main body (3) of the dispensing device (1) and the dispensing device (1) is actuated to adopt the closed configuration when the cup (8) is separated from the main body (3) of the dispensing device (1) or when the dispensing device is at rest.

10. The dispensing device according to claim 1, comprising a lid (8a) configured to close and cover at least partly the cup (8), wherein the lid (8a) has ribs (14) resting on an inner wall of the cup (8) and designed to absorb a deforming force, the ribs (14) being positioned along the main direction of extension of the dispensing device (1).

11. The dispensing device according to claim 10, wherein the ribs (14) are designed to rest on respective ribs (15) made on an inner surface of the cup (8) making rotationally integral the lid (8a) with the cup (8) in such a way that a twisting movement applied to a first one of the lid (8a) and the cup (8) is transmitted unchanged to a second one of the lid (8a) and the cup (8).

12. The dispensing device according to claim 1, wherein the lower portion of the cup (8) has an S-shaped profile configured to make a cup-shaped spring designed to absorb a deforming force exerted on the dispensing device.

13. The dispensing device according to claim 1, comprising a lid (8a) configured to close and cover at least partly the cup (8), wherein the lid (8a) has an annular groove (8b) designed to receive an upper portion of the cup (8), in a reversible manner.

14. A dispensing device (1) for fluid products comprising:
a draw-up pipe (2) which defines a main direction of extension of the dispensing device;
a main body (3) comprising a pumping system (5) connected to the draw-up pipe (2) and a fastening ring nut (6) configured for fixing the dispensing device (1) to a container for fluid products, wherein the fastening ring nut (6) has a central opening in which is housed the pumping system (5);
a dispensing head (4) connected to the main body;
wherein the fastening ring nut (6) and the pumping system (5) are mutually coupled for forming an air compensation duct (7) for selective passage of air from the outside towards the inside of the container,
wherein the pumping system (5) comprises: a pumping device (5b) and an outer body (5a) housed inside the pumping device (5b), the outer body (5a) being of tubular shape which can be coupled with the fastening ring nut (6) by axially inserting inside a central opening of the fastening ring nut (6).

15. A dispensing device (1) for fluid products comprising:
a draw-up pipe (2) which defines a main direction of extension of the dispensing device;
a main body (3) comprising a pumping system (5) connected to the draw-up pipe (2) and a fastening ring nut (6) configured for fixing the dispensing device (1) to a container for fluid products, wherein the fastening ring nut (6) has a central opening in which is housed the pumping system (5);
a dispensing head (4) connected to the main body;
wherein the fastening ring nut (6) and the pumping system (5) are mutually coupled for forming an air compensation duct (7) for selective passage of air from the outside towards the inside of the container,
wherein the fastening ring nut (6) comprises:
a first hollow cylindrical portion (61) parallel to a sliding direction of the fluid products from the main body (3) to the dispensing head (4) and equipped inside with a threaded profile designed to engage with a respective threaded profile of a cylindrical end of the container for the fluid products;
a second disc-shaped portion (62) positioned transversally to the sliding direction of the fluid products and inside the first hollow cylindrical portion (61) at a height such as to divide the first hollow cylindrical portion into a lower zone, having the thread, and an upper zone (65);
a vertical step (63) extending from the second portion (62) towards the dispensing head parallel to the sliding direction of the fluid products in a position radially inside the upper zone (65);
an elastic tab (64) extending from an edge radially inside the second portion (62) parallel to the sliding direction of the fluid products towards the draw-up pipe.

16. The dispensing device according to claim 15, wherein the central body (5a) has a step (5c) configured for making contact with the edge radially inside the second portion (62) of the fastening ring nut (6), defining a maximum depth for inserting the pumping system (5) inside the fastening ring nut (6).

17. The dispensing device according to claim 15, wherein the upper zone (65) and the vertical step (63) define edges of a blind seat designed to receive a portion of the dispensing head.

18. The dispensing device according to claim 15, wherein the elastic tab (64) is configured for making contact with a step (5d) of the outer body (5a) in such a way as to prevent withdrawal of the pumping system (5) from the fixing ring nut (6).

19. The dispensing device according to claim 18, wherein the elastic tab (64) is configured for adopting a first configuration or rest configuration wherein the outer body (5a) rests on the tab (64) with a step (5c) in a raised position relative to the edge radially inside the second portion (62) of the fastening ring nut (6) and a second configuration or elastically deformed configuration wherein the elastic tab (64) is elastically deformed by action of the outer body (5a) when the outer body (5a) is in the lowered position with the step (5c) in contact with the edge radially inside the second portion (62) of the fastening ring nut (6).

20. The dispensing device according to claim 19, further comprising a locking mechanism coupling the dispensing head (4) and the ring nut (6),
wherein the tab (64) is configured for adopting a rest configuration when the dispensing device (1) is not being used and the dispensing head (4) is disconnected from the ring nut (6) and an elastically deformed configuration when the dispensing head (4) is locked in low end of stroke position by action of the locking mechanism.

21. The dispensing device according to claim 19, wherein an outer surface of the outer body (5a) has discontinuity (5e) for allowing the selective passage of air from the outside towards the inside of the container.

22. The dispensing device according to claim 16, wherein the pumping system (5) is axially movable along the sliding direction of the fluid products, the axial movement being limited between two stop ends, a first stop end being defined by the step (5c) configured for making contact with an outer portion of the portion of the fastening ring nut (6) delimiting the central opening, and a second stop end being defined by the elastic tab (64).

23. The dispensing device according to claim 15, wherein the air compensation duct (7) has at least a first stretch passing between an outer body (5a) and the vertical step (63) and a second stretch passing between the outer body (5a) and the elastic tab (64).

\* \* \* \* \*